Figure 5:
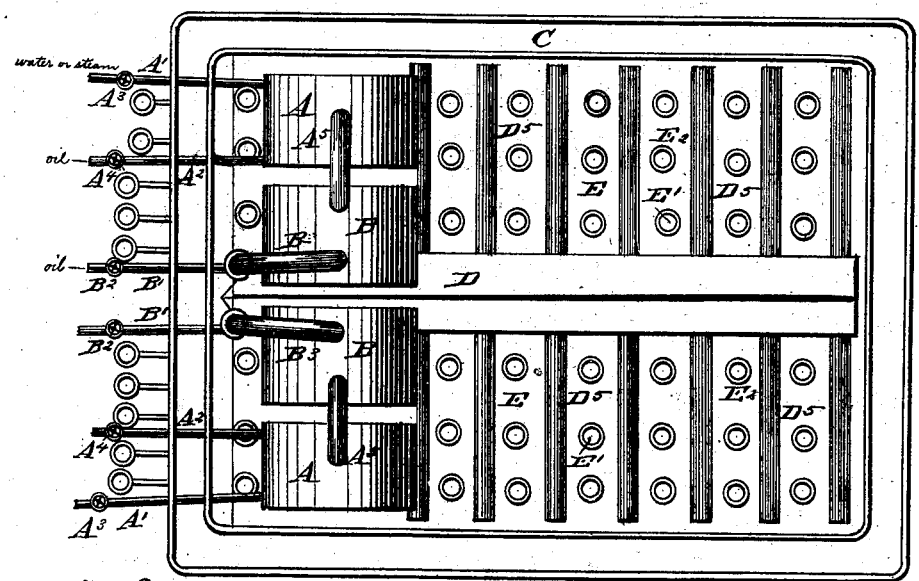

(No Model.) 3 Sheets—Sheet 1.
C. HOLLAND.
HYDROCARBON FURNACE.
No. 275,489. Patented Apr. 10, 1883.
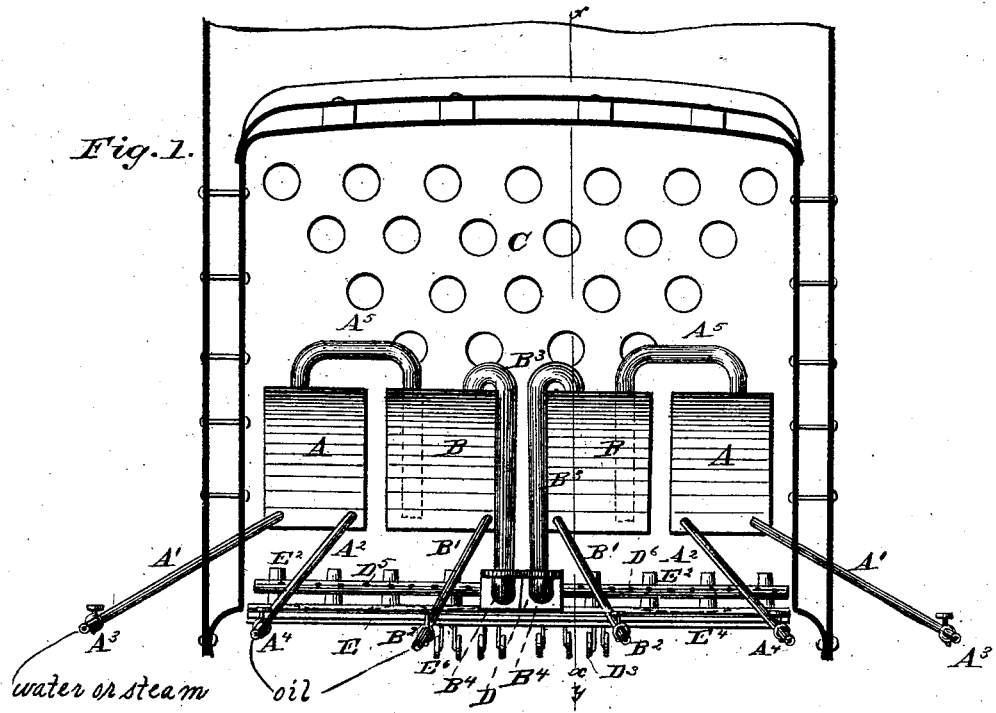
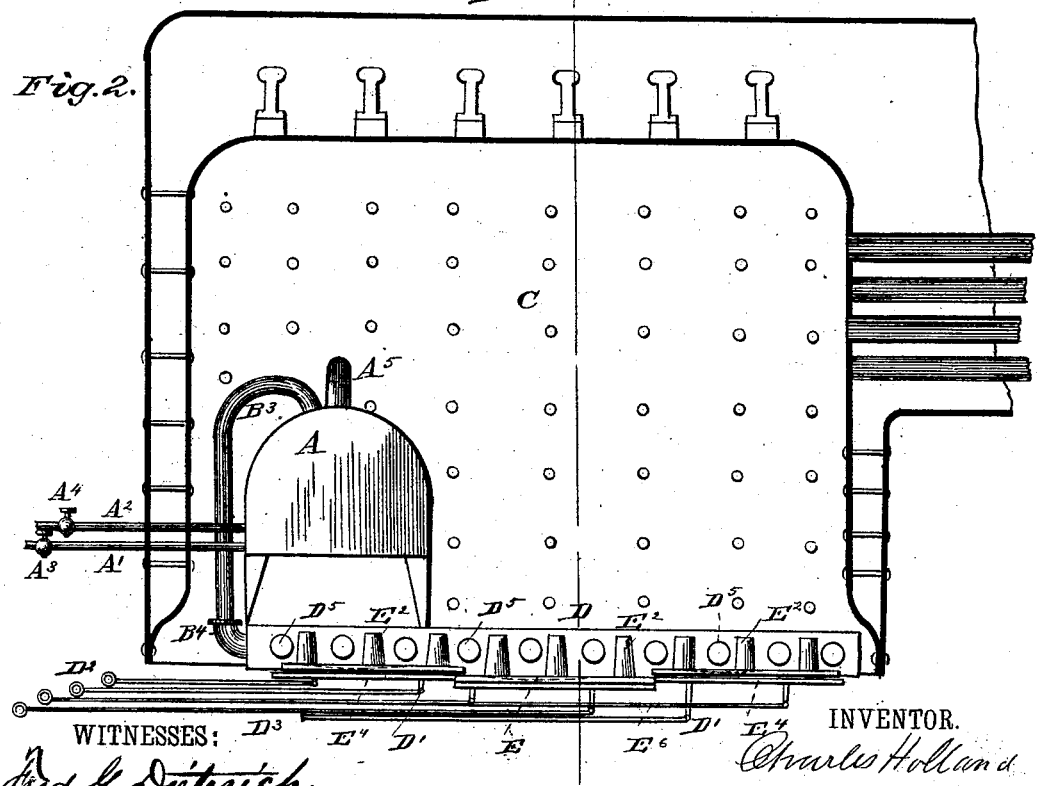
WITNESSES: Fred. G. Dieterich. F. C. Dietrich.
INVENTOR. Charles Holland
ATTORNEY (No Model.)  3 Sheets—Sheet 2.
C. HOLLAND.
HYDROCARBON FURNACE.
No. 275,489. Patented Apr. 10, 1883.
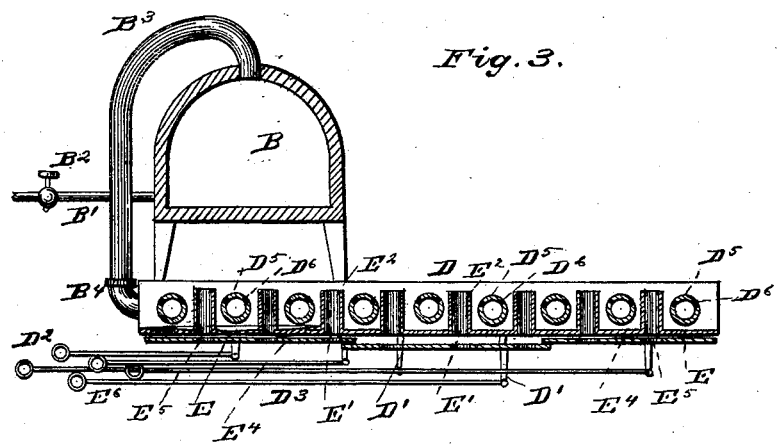
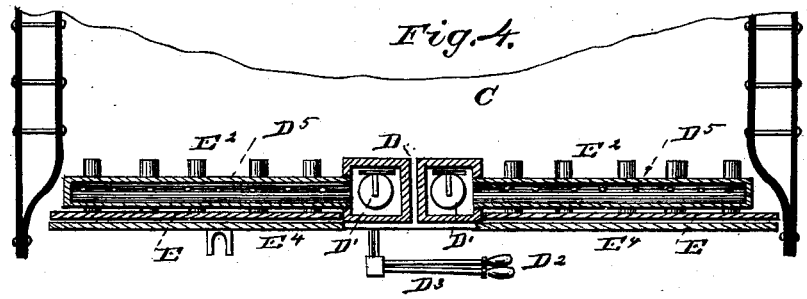
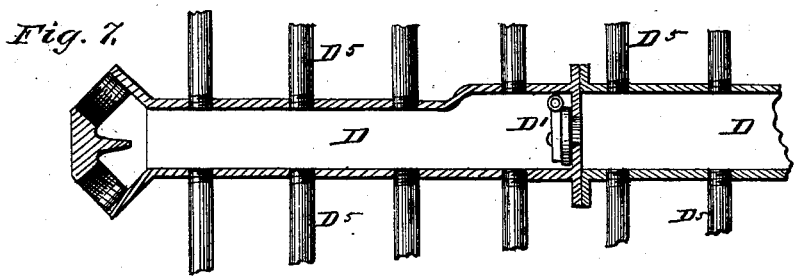
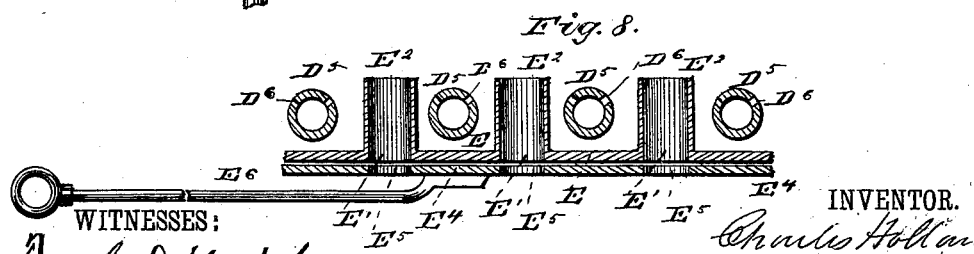
WITNESSES:
INVENTOR.

(No Model.) 3 Sheets—Sheet 3.

C. HOLLAND.
HYDROCARBON FURNACE.

No. 275,489. Patented Apr. 10, 1883.

WITNESSES:
Fred. G. Dieterich
F. C. Dieterich

INVENTOR.
Charles Holland
per Shy W. Wiegand
ATTORNEY

UNITED STATES PATENT OFFICE.

CHARLES HOLLAND, OF NEW YORK, N. Y.

HYDROCARBON-FURNACE.

SPECIFICATION forming part of Letters Patent No. 275,489, dated April 10, 1883.

Application filed April 25, 1882. (No model.)

*To all whom it may concern:*

Be it known that I, CHARLES HOLLAND, of the city, county, and State of New York, have invented certain new and useful Improvements in Hydrocarbon-Furnaces; and I do hereby declare the following to be a sufficiently full, clear, and exact description thereof to enable others skilled in the art to make and use the said invention.

This invention relates to that class of hydrocarbon-furnaces wherein hydrocarbons are volatilized in retorts located in and heated by the furnace, and water also volatilized and commingled in similarly-heated retorts with the hydrocarbon-vapors, and the resultant mixture or compound burned with regulated jets of air in an inclosed combustion-chamber.

This invention has for its object the complete utilization of the combustibles, entire cleanliness of the heating-surfaces of the connected apparatus, and the avoidance of deleterious or offensive waste products, together with a great simplification of apparatus, securing a diminution in cost of construction, increased durability, and increased facility of management and control.

The nature of this invention to effect these objects may be briefly stated to consist of an assemblage of upwardly-projecting air-inlet tubes, each tube having a valve at its base, and formed with the floor or bottom of the furnace-chamber, combined with a series of main gaseous-fuel-distributing pipes having perforated branches or jet-tubes and provided with valves, whereby the gaseous fuel may be supplied to or excluded from any section at the option of the engineer, the jet-tubes and the apertures therein being so located as to deliver the jets of gaseous fuel obliquely over the air-inlet tubes, and a series of retorts, located in the furnace, into one or more of which hydrocarbon fluids and water or steam are admitted, and the resultant products delivered by a suitable tube into the lower part of a second retort or series of retorts, into which an additional supply of hydrocarbon fluid is introduced, and from which the products of distillation pass by suitable pipes through the fuel-distributing mains to the points of combustion above the air-tubes. The arrangement of valves for regulating the air-supply and of valves for controlling the flow of gaseous fuel to the jet-tubes is such that the fuel and air may be burned under the retorts only as is desirable in starting, and may be admitted to or excluded from the several parts of the furnace, it being important for the successful working of the invention that a proper relation of quantity of hot gaseous fuel presented to each inflowing jet of heated air be maintained.

I will now proceed to particularly describe the mode of making and using this invention, referring in so doing to the drawings annexed and the letters of reference marked thereon.

Figure 6:
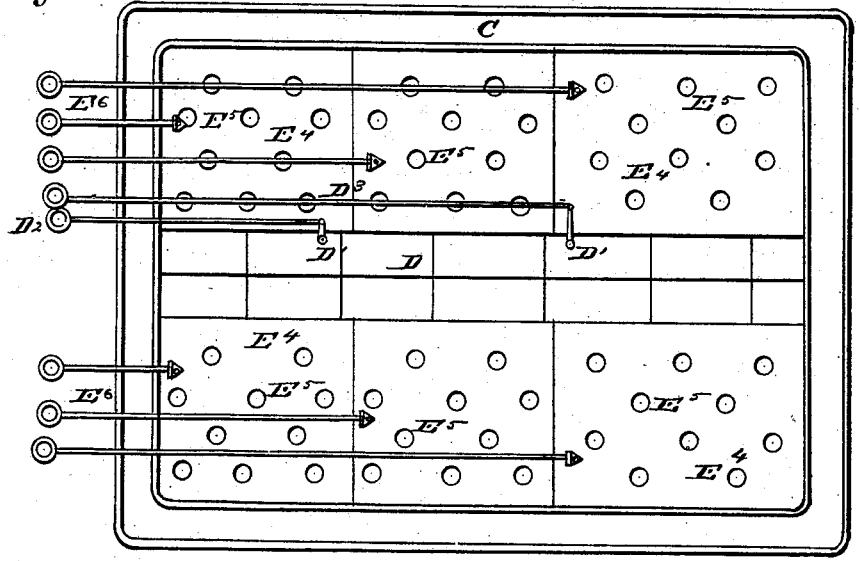

Figure 1 represents a front view of the apparatus as applied to a locomotive-boiler, the front wall of the furnace being removed; Fig. 2, a side view with the side wall removed. Figs. 3 and 4 are longitudinal and transverse sections, made respectively in the planes indicated by the dotted lines $x\,x$ and $y\,y$ in Figs. 1 and 2. Fig. 5 is a top view with the furnace crown or roof removed. Fig. 6 is a bottom view, showing the means of operating the air and fuel valves, and the remaining figures show the several parts in section upon an enlarged scale.

The same letters of reference refer to the same parts in the several figures.

A A are retorts, preferably made of wrought-iron, semi-cylindrical in form, and placed in the furnace C with their convex sides upward. At the lower part of the retorts A A are inserted small tubes A' A', through which water may be introduced into the retorts, the flow thereof being regulated by the valves $A^3\,A^3$. Another pair of pipes, $A^2\,A^2$, are connected with the retorts A A, and convey naphtha or other hydrocarbon fluid into the retorts A A, the flow thereof being regulated by the valves $A^4\,A^4$. Pipes $A^5\,A^5$ are inserted in the tops of the retorts A A, and extend into similar retorts, B B, through the tops thereof nearly to the bottoms, as indicated by the dotted lines in Fig. 1. Small tubes B' B', provided with valves $B^2\,B^2$, are inserted into the retorts B B near the bottom, and serve to admit thereto in regulated quantities a supply of naphtha or other hydrocarbon fluid. From the tops of the retorts B B are pipes $B^3\,B^3$, extending downward to elbows $B^4\,B^4$, attached by suitable couplings to the gas-main or fuel-pipe D. The pipe D is placed horizontally in the center of the furnace, preferably made rectangular in cross-section, and is made in two or more lengths, with valves D' between them, which are opened or closed, at the option of the engineer, by handles D², attached to levers D³.

Figure 9:
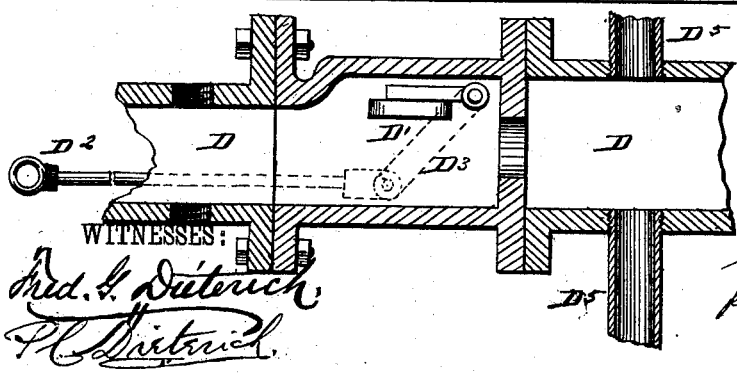

The valve D' consists of a circular disk attached to a lever or arm turning with an upright spindle, so as to be either closed over the opening in a flat disk separating the sections of the pipe D, or to assume a position parallel with the side of the pipe, as shown in the enlarged section in Fig. 9.

Into the sides of the gas-main D are inserted at regular intervals horizontal pipes D⁵, closed at the outer ends, and having perforations D⁶ made at regular intervals in them, from which gaseous fuel issues in jets obliquely to the horizontal plane, (an angle of forty-five degrees having been found satisfactory.)

Underneath the gas-pipe D and its branches D⁵ are placed a series of floor-plates, E, so as to shut up the bottom of the furnace-chamber C. These floor-plates are so fitted to the furnace-walls and to each other as neither to strain nor open air-leaks between them as they expand and contract with changes of temperature, and have perforations E', with short tubes E² projecting upward therefrom at regular intervals into the furnace C. The location of the apertures E' and tubes E² are such that the current of air rising through them intersects two of the jets of gaseous fuel issuing from the apertures D⁶ in the contiguous branch gas-pipes D⁵.

Beneath the plates E are a series of sliding plates, E⁴, supported upon guides, so as to move longitudinally, and having perforations E⁵, which may be made to coincide with the perforations E' in the floor-plates E. The plates E⁴ are arranged in several sections, corresponding in length with the sections of the pipe D, so that the air admitted to the jets of gaseous fuel issuing from the branch tube D⁵ of each section of the pipe D can be separately controlled by moving each section of plates E⁴ by means of the separate handles E⁵, connected thereto by the rods E⁶.

The operation of the invention is as follows: A small portion of combustible fluid is poured in the furnace upon the plates E, under the retorts A and B, which plates E are at this point, as shown in dotted lines in Figs. 1, 2, and 3, made concave or dished for the purpose, and is ignited by a lighted match previously laid under the retorts. The flame from this fluid heats the retort and the valves in the pipe D', and the valves A⁴ are opened, admitting naphtha to the retorts A through the pipes A². A very small amount of water is admitted through the pipes A' to the retorts A by opening the valve A³. The products of the distillation of naphtha and water pass from the retorts A through the pipes A⁵ into the retorts B, and additional naphtha is admitted through the pipes B' to the retorts B by opening the valve B².

The products of this distillation pass from the retorts B by the pipes B³ and elbows B⁴ to the gas-main D, issue through the apertures D⁶ in the pipes D⁵ under the retorts A and B, and there burn upon meeting the air entering through the tubes E², and generating intense heat. The retorts A and B having thus attained sufficient heat, the valves D' are opened, and also the air-valve or sliding plates E⁴ under the other sections of the pipe D, and the branches D' connected therewith. Increased supplies of naphtha and water may now be admitted to the retorts A and B, and the furnace-chamber becomes filled with burning gases, generating intense heat, but without much illuminating properties, the appearance of the flames in combustion being at the points of entrance of the air, above the tubes E, in color like the flame of hydrogen and of carbonic oxide. The temperature thus generated is so intense that a less space for a combustion-chamber than has heretofore been necessary in steam-boiler and other furnaces suffices. All portions of the tube-work exposed to temperature being free to expand and contract without strain, the apparatus is durable and remains tight in the joints, and all parts of the apparatus being included in the furnace, the gases are not cooled or the combustion impaired by loss of heat through radiation.

It is found experimentally that the products of distillation, passing through the pipe D, do not corrode or impair the valve D' or the tubes D⁵ after first forming a coating thereon by oxidation.

In describing the operation of this invention I have spoken of naphtha as the hydrocarbon supply employed. This is preferable on account of its cheapness and abundance; but other hydrocarbon fluids may be usefully employed instead, and I do not wish to be understood as stating that the utility of the apparatus is restricted to naphtha.

I do not claim broadly as part of this invention the combination of valves for intercepting the flow of gas through the longitudinal gas and steam distributing tubes of hydrocarbon-furnaces, valves of other forms not possessing the same properties appearing in another application (No. 34,750) for Letters Patent to me.

Having described my invention and the mode of making and using the same, what I claim is—

1. The method of utilizing hydrocarbon fluids and water by distilling such hydrocarbon fluids with water in a retort or retorts and passing the products of such distillation into a second retort, and there redistilling them with an additional supply of hydrocarbon fluid, and burning the products of such second distillation in an inclosed combustion-chamber containing said retorts, with a regulated and distributed supply of air heated during its admission, substantially as and for the purpose set forth.

2. In a furnace heated by the combustion with air of the products of distillation of water and hydrocarbon fluids in retorts contained therein, the combination of distributing-pipes D and valve D', constructed substantially as shown and described, and perforated branch tubes $D^5$, with the plates E, having tubes E' formed thereon, and sliding plates $E^4$, all constructed and arranged for controlling the air-admission and gaseous-fuel supply, substantially as and for the purpose set forth.

CHARLES HOLLAND.

Witnesses:
ARTHUR FITCH,
WILLIAM E. MASEN.